(12) United States Patent
Wong et al.

(10) Patent No.: US 10,055,006 B2
(45) Date of Patent: Aug. 21, 2018

(54) REDUCING SYSTEM ENERGY CONSUMPTION THROUGH EVENT TRIGGER COALESCING

(71) Applicant: Microsoft Technology Licensing, LLC, Redmond, WA (US)

(72) Inventors: Graham Wong, Kirkland, WA (US); Hari R. Pulapaka, Redmond, WA (US); Eric Bluestein, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 184 days.

(21) Appl. No.: 15/083,796

(22) Filed: Mar. 29, 2016

(65) Prior Publication Data

US 2017/0285721 A1    Oct. 5, 2017

(51) Int. Cl.
| | |
|---|---|
| *G06F 9/46* | (2006.01) |
| *G06F 9/44* | (2018.01) |
| *G06F 3/00* | (2006.01) |
| *G06F 1/32* | (2006.01) |
| *G06F 9/48* | (2006.01) |
| *G06F 9/54* | (2006.01) |

(52) U.S. Cl.
CPC ............ *G06F 1/329* (2013.01); *G06F 9/4843* (2013.01); *G06F 9/4893* (2013.01); *G06F 9/542* (2013.01); *Y02D 10/24* (2018.01)

(58) Field of Classification Search
None
See application file for complete search history.

(56) References Cited

U.S. PATENT DOCUMENTS

| | | |
|---|---|---|
| 6,189,067 B1 | 2/2001 | Lowe et al. |
| 6,351,785 B1 | 2/2002 | Chen et al. |
| 6,529,986 B1 | 3/2003 | Chen et al. |
| 6,574,694 B1 | 6/2003 | Chen et al. |
| 8,478,924 B2 | 7/2013 | Ahmad et al. |
| 9,542,230 B2 * | 1/2017 | Kumar .................. G06F 9/5038 |
| 2005/0097569 A1 | 5/2005 | Chandrasekaran |
| 2006/0025869 A1 | 2/2006 | Virdi et al. |

(Continued)

OTHER PUBLICATIONS

Apple; Power Efficiency in OS X; Apple Inc., 2013 (Year: 2013).*

(Continued)

*Primary Examiner* — Bing Zhao
(74) *Attorney, Agent, or Firm* — Workman Nydegger (57) ABSTRACT

Coalescing triggers from external events. Embodiments include receiving a plurality of triggers, each associated with occurrence of an external event. A first trigger identified as time critical is scheduled for firing. A second trigger identified as opportunistic is coalesced with others of the plurality of triggers. Coalescing includes determining an importance of an application-based workload associated with the second trigger, determining a system state relevant to firing the second trigger, and determining a condition for firing the second trigger based on the importance of the workload and the system state. Coalescing also includes identifying that the condition for firing the second trigger aligns with a condition for firing the others of the plurality of triggers, and scheduling the second trigger for firing along with the others of the plurality of triggers. Embodiments also include subsequently firing the second trigger along with the others of the plurality of triggers.

18 Claims, 2 Drawing Sheets

(56) References Cited

U.S. PATENT DOCUMENTS

2012/0198477 A1   8/2012  Jennings et al.
2013/0061251 A1   3/2013  Schwartz et al.
2014/0289745 A1   9/2014  Nirantar
2014/0370911 A1  12/2014  Gorgenyi et al.
2014/0380075 A1  12/2014  Pulapaka et al.
2015/0212564 A1   7/2015  Min et al.

OTHER PUBLICATIONS

International Search Report and the Written Opinion issued in PCT Patent Application No. PCT/US2017/023923 dated Jun. 30, 2017.
"Windows 7 Power Management", In White Paper of Microsoft Corporation, Apr. 2009, 14 pages.

\* cited by examiner

REDUCING SYSTEM ENERGY CONSUMPTION THROUGH EVENT TRIGGER COALESCING

CROSS-REFERENCE TO RELATED APPLICATIONS

Not Applicable.

BACKGROUND

As computing technology continues to evolve, tasks performed by a given computer system is increasingly reliant upon, and often triggered by, environment and stimuli that are external to the computer system. For example, applications running on a computer system may respond to events initiated by another computer system (e.g., receipt of an e-mail, receipt of a push notification, etc.), or may respond to changes in the environment in which the computer system operates (e.g., a change in location as detected by a GPS sensor or a change in network state, a change in device orientation, a change in lighting, receipt of a user-initiated input, etc.).

An application could, for example, want to run a particular piece of code in response to the computer's network connectivity state changing, or in response to a Global Positioning System (GPS) receiver indicating the device has entered a particular geographic region. Thus, the occurrence of an external environmental event can cause one or more applications to activate to perform background activity in response to the trigger. For example, an application may activate to process changed GPS coordinates or changed network state, to process a push notification, etc. This allows flexibility for applications to react to a wide variety of real-world stimuli and provide useful experiences to users.

Computer systems cannot control when, or how often, external events occur. For example, an operating system cannot control how often a phone moves to a particular location, or how often a Wireless Fidelity (WiFi) signal cuts in and out. Thus, it is possible for environmental conditions to occur or change state so frequently that an undesired amount of background activity is caused by the environmental conditions. For example, code that applications have registered to run in response to a particular event could end up getting called far more frequently than the developer intended, resulting in excessive energy consumption by the computer system. This wastes energy, prematurely drains batteries on portable devices, and causes excessive heat generation.

BRIEF SUMMARY

Embodiments herein are directed to conserving energy consumed by a computer system, and reducing heat generated by the computer system, by coalescing activation of triggers caused by external events that can invoke background activity by applications. Embodiments thereby reduce the frequency of application activity, or delay it to a more appropriate time. Thus, even if external events signal triggers to occur frequently, the triggers can be configured such that application code only runs as a result of the triggers with a predictable frequency.

Some embodiments are directed to methods, systems, and computer program products for coalescing triggers from events external to a computer system. Embodiments include receiving a plurality of triggers. Each trigger is associated with the occurrence of a corresponding external event and has a type based on a type of the external event. Embodiments also include identifying that a first trigger of the plurality of triggers is time critical based on a first type of the first trigger, and scheduling the first trigger for firing based at least on the first trigger being time critical. Embodiments also include identifying that a second trigger of the plurality of triggers is opportunistic based on a second type of the second trigger, and coalescing firing of the second trigger with one or more others of the plurality of triggers based at least on the second trigger being opportunistic.

Scheduling the second trigger includes determining an importance of a workload associated with firing of the second trigger, based on at least one application that has registered to receive notification of triggers of the second type. Scheduling the second trigger also includes determining a system state relevant to firing the second trigger. Scheduling the second trigger also includes determining a condition for firing the second trigger, based at least on the importance of the workload and the system state, identifying that the condition for firing the second trigger aligns with a condition for firing the one or more others of the plurality of triggers, and scheduling the second trigger for firing along with the one or more others of the plurality of triggers when the condition for firing the second trigger is met. Embodiments also include, subsequent to scheduling the second trigger for firing along with the one or more others of the plurality of triggers, firing the second trigger along with the one or more others of the plurality of triggers.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments herein are directed to conserving energy consumed by a computer system, and reducing heat generated by the computer system, by coalescing activation of triggers caused by external events that can invoke background activity by applications. Embodiments thereby reduce the frequency of application activity, or delay it to a more appropriate time. Thus, even if external events signal triggers to occur frequently, the triggers can be configured such that application code only runs as a result of the triggers with a predictable frequency.

The stimuli for triggers that cause background application activity are typically events that are external to the computing system. Examples include the arrival of a push notification, text message, or email; changes in the computing devices' physical location reported by a GPS module; changes in the device's network state; etc. The devices' operating system can often not reliably predict ahead of time how often these trigger events will occur. Furthermore, the frequency of the events could vary dramatically from device to device, or even on the same device during different periods of usage (for example, one day a phone moves around a lot and frequently changes cell towers, and on another day it mostly sits on a desk and never activates any network connectivity changed triggers). This means that for systems that allow activity to start as the result of external stimuli outside of the operating system's control, power consumption could be unpredictable and unbounded.

To address the foregoing, embodiments coalesce (e.g., combine and/or batch up) activations of different triggers (including triggers of the same type and/or triggers of different types), into a single activation. Thus, with trigger coalescing, an operating system can wait for multiple triggers to be ready to signal/fire, and signal/fire them all at once. Any associated applications are therefore woken at the same time, and/or at bounded intervals, reducing power consumption by these applications.

Figure 1:
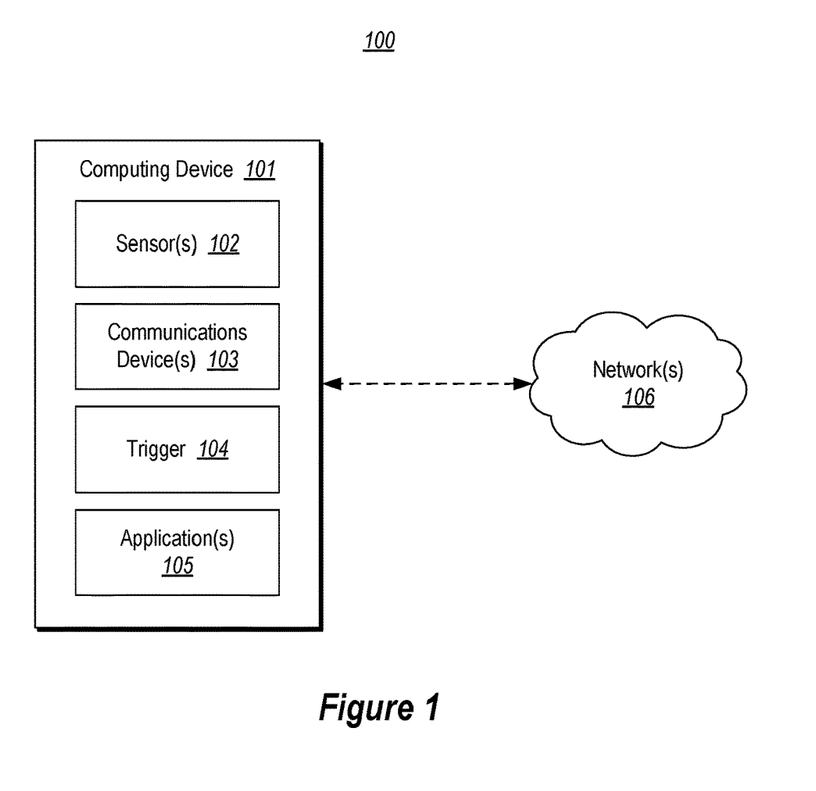
FIG. 1 illustrates an example computing environment for coalescing activations of different triggers into a single activation.

To the accomplishment of the foregoing, FIG. 1 depicts an example computing environment 100 for coalescing activations of different triggers into a single activation. As depicted, the computing environment 100 includes a computing device 101 that is configured to respond to environmental stimuli. For example, the computing device 101 includes sensors 102. Sensor(s) 102 may include any device that can encode some external stimuli or environmental condition into an electronic form that is interpretable by the computing device 101. Example senor devices may include a digital thermometer, a barometer, a gyroscope, a proximity sensor, an accelerometer/motion detector, a GPS receiver, a digital compass, a camera, an ambient light sensor, etc. Additionally, the computing device includes communications device(s) 103, such as a WiFi module, a BLUETOOTH module, an Ethernet module, a cellular communications module, etc. Accordingly, the computing device 101 may be connected to one or more networks 106.

Using the sensors 102 and/or the communications devices 103, the computing device 101 can receive external stimuli, and generate triggers from the stimuli. For example, FIG. 1 depicts that the computing device 101 includes a trigger component 104. Trigger component 104 generally represents functionality provided by the computing device 101 to receive external stimuli, to create triggers from the stimuli, and to schedule and otherwise process/fire those triggers. As such, trigger component 104 may represent a variety of different components/modules that work together as part of handling triggers caused by external stimuli. FIG. 1 also depicts that computing device 101 has applications(s) 105 executing thereon. One or more of these applications may register with the trigger component 104 to receive notifications when certain triggers fire, and may be configured to execute defined code as a result of being notified that a trigger has fired.

Figure 2:
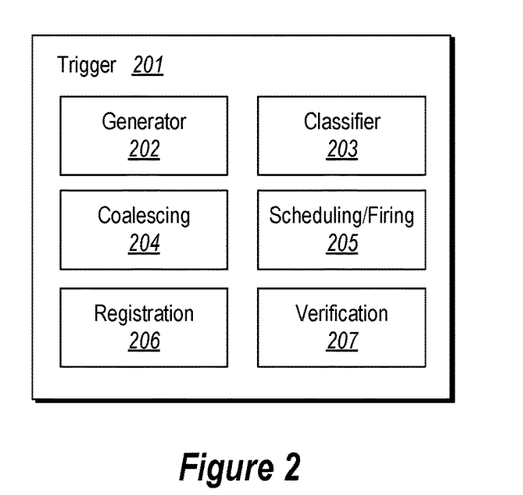
FIG. 2 illustrates an example trigger component.

FIG. 2 illustrates a trigger component 201 that, for example, may correspond to the trigger component 104 of FIG. 1. In particular, FIG. 2 illustrates that the trigger component 201 includes a plurality of component/modules that each represent corresponding functionality. It will be appreciated that the number and arrangement of these component/modules is for ease in description only, and that the embodiments described herein are not limited to the particular arrangement depicted.

As depicted, the trigger component 201 includes a generator component 202. The generator component 202 receives external stimuli (e.g., from the sensors 102 and/or the communications devices 103), and creates or generates one or more triggers corresponding to the stimuli. In general, the generator component 202 can create triggers of different types, based on the type of the stimulus upon which the trigger is based. For example, one type of trigger may be generated based on GPS data, another type of trigger may be generated based on network data, different types of triggers may be generated based on different types of push notifications, etc. Some triggers can include corresponding parameters, such as network state data, GPS data, data associated with a push notification, sensor data, etc.

The trigger component 201 also includes a classifier component 203. Unlike other types of system events, such as timers, triggers can be the result of a wide variety of stimuli, and can have complex inputs. Thus, unlike other types of system events, it is important for external triggers to initially determine if two activations of a particular trigger, or activations of different triggers, can be combined into a single signal. The classifier component 203 can therefore classify triggers into different categories, including as those that are coalesce-able and those that are not. The classifier component 203 can send coalesce-able triggers to a coalescing component 204, and can send non-coalesce-able triggers to a scheduling/firing component 205.

Triggers that may not be coalesce-able may include those triggers that are time-critical, since they need to be fired immediately (or at least without significant delay). Examples of time-critical triggers may include alarm-related triggers, time-related triggers, critical network state change triggers (e.g., when a cellular device enters a roaming area), etc.

Triggers that are coalesce-able are generally those that are "opportunistic." Opportunistic triggers are those can be delivered at the next appropriate opportunity, potentially with a delay. Opportunistic triggers may include those triggers in which delay caused my coalescing the triggers could adversely affect a dependent workload. For example, it might be acceptable to adversely affect a dependent workload of a trigger (e.g., delay its execution) in favor of energy savings.

Triggers may be coalesce-able with triggers of the same type (i.e., triggers that are raised by the same type of external event) and/or coalesce-able with triggers of other types (i.e., triggers that are raised by different types of external events). Triggers that are coalesce-able with triggers of the same type include those for which combining multiple activations of the same trigger type within a specified time period into a single activation would not result in data loss or prevent applications from being able to respond to the trigger's signal as intended. These triggers generally include triggers that do not have any associated data or payload, or triggers that have data or payload, but for which only the most recent payload needs to be retained or processed for correct operation. For these types of triggers, correct behavior may only depend on informing applications of at least one instance of the trigger being signaled, but not necessary on informing applications of each and every instance. For example, a trigger that indicates that the device's network state has changed can be signaled once after many changes, and applications that rely on network state change data can run the relevant update routines once, based on the most recent network state change.

Triggers that are coalesce-able with triggers of the same type may also include triggers that have an associated data/payload that is readily combinable. For example, if triggers that indicate that the device's geographical location has changed include a payload including geographical coordinates, the payloads of multiple triggers may be combined into a single payload, such as by concatenating the coordinates together to form a list of coordinates. Other options for combining payload may include aggregating values of one payload with values of another payload, replacing the portions of one payload with portions of another payload, etc.

Triggers that are coalesce-able with triggers of the same type may also include triggers in which the data/payload of a subsequent trigger invalidates the data/payload of a prior trigger. For example, a sequence of two triggers signaling changes in network connectivity might include a network state changing to "disconnected," followed by the network state changing to "connected." Many applications may only need to be informed about the second instance, and thus the second trigger can invalidate the first trigger.

Whether or not triggers are coalesce-able with other triggers of the same type, triggers may also be coalesce-able with triggers of different types. In such cases, different activations are fired for each trigger type, but these different triggers are scheduled to fire at roughly the same time. As an example, a phone-based computing device traveling among different geographical locations may encounter multiple network state changed events as it connects to different cell towers, and while also receiving a number of new email notification triggers. Network state change triggers and email notification triggers are not combinable into a single trigger, because they have different subscribers and data, but the network state change triggers may be combinable into a single trigger, and the email notification triggers may be combinable into a single trigger, and both of these triggers can be coalesced to be fired at the same time, causing a single wake up (i.e., change from a low-power device or processor state to an active device or processor state) and two trigger activations, instead of multiple wake ups and multiple activations for each trigger type.

The coalescing component 204 works in conjunction with the scheduling/firing component 205 to determine how to coalesce triggers, and when to schedule them for signaling/firing. In doing so, the coalescing component 204 can take into consideration each of the foregoing considerations for coalescing multiple triggers of the same type (including combining/invalidating data or other payloads) into a single trigger, and for coalescing triggers of different types to fire at substantially the same time.

Additionally, the coalescing component 204 can take into consideration other factors, such as the importance of a workload associated with a trigger. For example, as indicated previously, the firing of a trigger generally causes one or more registered applications to be activated for associated code to be executed. Thus, FIG. 2 illustrates that the trigger component 201 can include or be otherwise associated with a registration component 206, which permits applications to register to receive notifications that particular types of triggers have been fired.

When determining if and how to coalesce a trigger, the coalescing component 204 can identify which application(s) are registered to receive notifications of the trigger's type. Based on the application(s) registered to receive notifications of the particular trigger's type, the coalescing component 204 may identify an importance of the workload that will be processed as a result of firing that trigger.

For example, the coalescing component 204 may consider the workloads of certain applications (e.g., communications applications, productivity applications, system-provided applications, etc.) as being more important than workloads of other applications (e.g., entertainment applications, shopping applications, etc.). In another example, registered application(s) may provide an indication of an importance of their workloads. In yet another example, the coalescing component 204 may consider the workload of the registered application(s) as being of increased importance if other workloads (e.g., from other applications) depends on processing of the registered application(s) workloads.

The coalescing component 204 can also take into consideration system state relevant to firing of the trigger. While the system state could include any available system state (e.g., current resource utilization, the identity and/or number of active processes, system uptime, system sleep time, battery level, whether or not wireless antennas are turned on or off, etc.), in some embodiments the system state includes system state that would be user facing. In particular, the system state may be relevant to whether there would be a user visible effect when the trigger is fired. Examples of such system state may include whether a registered application is actively executing and/or whether its user interface is currently visible (or when the application is anticipated to be executing and/or its user interface is anticipated to be visible based on past usage patterns), whether a screen of the computer system is on or off, whether a notification based on the firing of the trigger would currently be displayed it were to be fired, etc.

The coalescing component 204 can use one or both of the importance of a workload associated with firing of the trigger, or system state relevant to firing of the trigger, to determine one or more conditions for firing the trigger and/or an interval over which to coalesce triggers for that type. For example, the coalescing component 204 may perform a weighting/balancing between workload importance and relevant system state to identify conditions for firing the trigger that would ensure that the trigger would be fired at a time that is appropriate for the workload, while potentially waiting to fire the trigger until a time that effects of firing the trigger would be user visible.

In an example of weighting system state over workload, if the trigger relates to a new e-mail notification, it may be appropriate given the workload to wait to fire the trigger until an e-mail notification would actually be visible to the user (e.g., wait until the device's screen is turned on to fire the trigger, while coalescing email notification triggers and/or trigger types in the meantime). In an example of weighting workload over system state, if the trigger relates to a network state update, it may be appropriate to fire the trigger relatively soon based on applications relying on network state updates, even though the trigger's effect may not be immediately user facing, to ensure that applications maintain network connectivity even while the device is not actively being used. In this example, the trigger may still be coalesced with other triggers of the same type or triggers of other types.

Conditions for firing the trigger may be time-based. For example, the coalescing component 204 may determine to fire the trigger at a defined time, at the end of a defined time interval (e.g., a coalescing interval), etc. Conditions for firing the trigger may be additionally or alternatively be based on some other factor. For example, the conditions for firing the trigger may be based upon a change in system state, such as when an application is activated, when the screen is turned on, when a wireless antenna is powered on, etc.

In some embodiments, an acceptable coalescing interval is defined in connection with coalesce-able triggers. The coalescing interval is the length of a time period during which a particular trigger should be fired at most once. This interval could be a system-wide policy, it could be set per trigger type, or it could be defined to be variable and determined dynamically based on various conditions in the system. In some embodiments, applications may be able to request a coalescing interval to use when coalescing the triggers to which they are subscribed. Thus, an application may be able to specify how long it can wait to receive notification of a trigger event without adversely affecting its workload. In such cases, the coalescing component 204 could to choose to honor application requests unconditionally (possibly after acquiring user consent), or could treat application requests as a hint or input to a system policy rather than treating them as a firm directive or requirement.

In some implementations, when a coalesce-able trigger is encountered for the first time, it is fired and a notification is delivered to any registered application(s) as it normally would be. A timer is then initialized and set to the duration of the coalescing interval for the trigger. If another instance of the same trigger is signaled before the timer expires, it is coalesced with the other trigger(s). When the timer expires at the conclusion of the coalescing period for a particular trigger, any coalesced triggers are fired and the timer is reset to begin a new coalescing interval. If there are no pending activations, the timer is disarmed and freed, and the next activation of the trigger will be permitted to activate normally and then begin a new coalescing interval.

When determining whether a trigger of one type can be coalesced with triggers of other types, the coalescing component 204 may identify whether the identified condition for firing the trigger aligns with, or is otherwise compatible with, conditions for firing other triggers of different types. For example, if the coalescing component 204 determines that a trigger is to be fired at a particular time or after a particular time interval, the coalescing component 204 can determine whether there are other triggers of different types that are already scheduled to fire at or near the same time. If so, the coalescing component 204 can schedule all these triggers to fire at substantially the same time. In another example, if the coalescing component 204 determines that a trigger is to be fired based on a change in system state (e.g., the screen being turned on), the coalescing component 204 can determine whether there are other triggers of different types that are also scheduled to fire based on the same state change (e.g., when the screen comes on). If so, the coalescing component 204 can schedule all these triggers to fire upon occurrence of the state change (e.g., when the screen comes on).

The scheduling/firing component 205 schedules triggers for firing, and fires them when appropriate (i.e., when the determined conditions are met). When the scheduling/firing component 205 fires triggers, the notification component 207 notifies any registered applications of the trigger's firing (along with any payload/data associated with the triggers). In some embodiments, the scheduling component will combine the firing of opportunistic triggers with time critical triggers. For example, if there are opportunistic triggers queued up for firing, and a time-critical trigger arrives and is fired, the scheduling/firing component 205 may fire the opportunistic triggers along with the time-critical trigger, since the system will need to be woken in connection with the firing of the time-critical trigger anyway. Additionally, the scheduling/firing component 205 may re-schedule the conditions for firing existing triggers based on various factors, such as changing conditions due to new incoming triggers. For example, if a batch of triggers were scheduled to fire at a given time in the future, and a new trigger arrives that needs to be fired earlier (or later) than the batch, the scheduling/firing component 205 may re-schedule to batch of triggers to fire at the same time as the new trigger.

Figure 3:
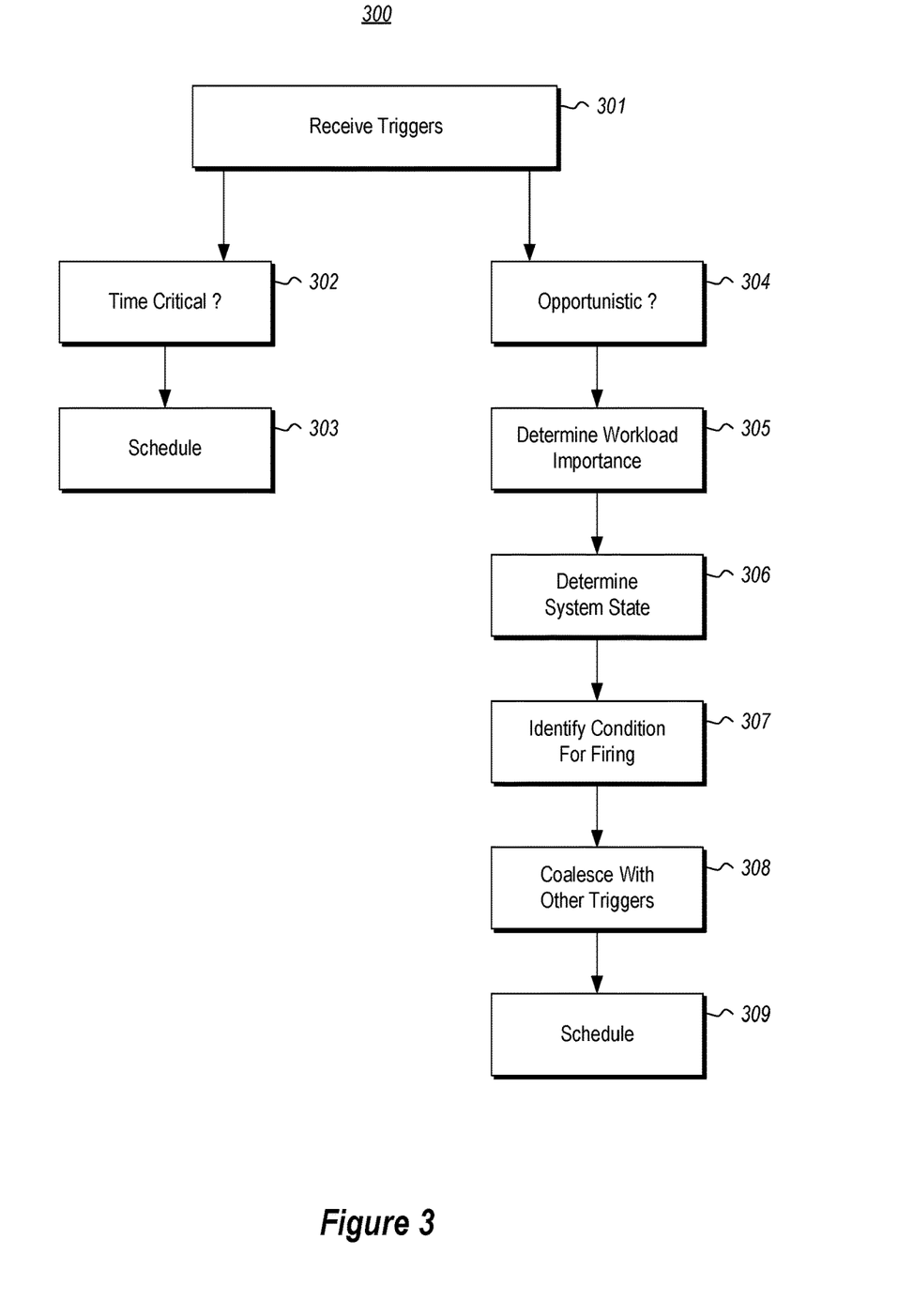
FIG. 3 illustrates a flowchart of an example method for coalescing triggers from events external to a computer system.

In view of the foregoing, FIG. 3 illustrates a flow chart of an example method 300 for coalescing triggers from events external to a computer system. While FIG. 3 illustrates a series of acts in a particular order, it will be appreciated that this is for ease in description only, and that other implementations may perform similar acts in different orders and/or in parallel.

Method 300 comprises an act 301 of receiving triggers. Act 301 can include receiving a plurality of triggers, each trigger being associated with the occurrence of a corresponding external event and having a type based on a type of the external event. For example, based on even data received from sensors 102 and/or communications devices 103, the trigger component 204 can identify a plurality of triggers. This may include the generator component 202 creating a plurality of different triggers, each having a type corresponding to the type of event upon which it is based.

Method 300 also comprises an act 302 of identifying a time-critical trigger. Act 302 can include identifying that a first trigger of the plurality of triggers is time critical based on a first type of the first trigger. For example, the classifier component 203 can determine if a trigger is time-critical based on its type. Examples of time critical triggers include alarm-related triggers, time-related triggers, critical network state change triggers (e.g., when a cellular device enters a roaming area), etc.

Method 300 also comprises an act 303 of scheduling the time-critical trigger. Act 303 can include scheduling the first trigger for firing based at least on the first trigger being time critical. For example, the scheduling/firing component 205 can schedule the time-critical trigger for firing. While the time-critical trigger may be scheduled to fire substantially immediately, it could also be scheduled to fire within an acceptable delay period. As such, time-critical triggers may also be coalesced, though typically on a smaller time scale than opportunistic triggers.

Method 300 also comprises an act 304 of identifying an opportunistic trigger. Act 304 can include identifying that a second trigger of the plurality of triggers is opportunistic based on a second type of the second trigger. For example, the classifier component 203 can determine if a trigger is opportunistic based on its type. Opportunistic triggers are those can be delivered at the next appropriate opportunity, potentially with a delay, without adversely affecting workload from a user facing perspective. Once the second trigger is identified as being opportunistic, the classifier component 203 can send the second trigger to the coalescing component 204 for coalescing firing of the second trigger with one or more others of the plurality of triggers, based at least on the second trigger being opportunistic.

Method 300 also comprises an act 305 of determining a workload importance. Act 305 can include determining an importance of a workload associated with firing of the second trigger, the workload based on at least one application that has registered to receive notification of triggers of the second type. For example, the registration component 206 can track which applications have registered to receive notifications of the firing of different triggers. Based on these registrations, the coalescing component 204 can determine how important the application's workload is (e.g., based on whether other applications dependent on the workload, whether the workload is time-sensitive, how user facing the workload is, etc.).

Method 300 also comprises an act 306 of determining a system state. Act 306 can include determining a system state relevant to firing the second trigger. For example, the coalescing component 204 may determine a system state relevant to when the trigger could be fired. In some embodiments, the system state includes system state that would be user facing, being relevant to whether there would be a user visible effect when the trigger is fired.

Method 300 also comprises an act 307 of identifying a condition for firing. Act 307 can include determining a condition for firing the second trigger, based at least on the importance of the workload and the system state. For example, the coalescing component 204 can use the importance of a workload associated with firing of the trigger, and/or system state relevant to firing of the trigger, to determine one or more conditions for firing the trigger and/or an interval over which to coalesce triggers for that type. Conditions for firing the trigger may be time-based, or may be based on some other factor, such as a change in the system state relevant to firing the second trigger.

Method 300 also comprises an act 308 of coalescing with other triggers. Act 308 can include identifying that the condition for firing the second trigger aligns with a condition for firing the one or more others of the plurality of triggers. For example, the coalescing component 204 may identify whether the identified condition for firing the second trigger aligns with, or is otherwise compatible with, conditions for firing other triggers of different types. For example, the condition for firing the second trigger may be a time or time interval that is the same as or close to a time or time interval for firing the other triggers, or may be based on the same or a similar change in system state that will cause the other triggers to fire.

Method 300 also comprises an act 309 of scheduling the trigger for firing. Act 309 can include scheduling the second trigger for firing along with the one or more others of the plurality of triggers when the condition for firing the second trigger is met. For example, the scheduling/firing component 205 can schedule the second trigger for firing, along with the one or more others of the plurality of triggers. Subsequent to scheduling the second trigger for firing along with the one or more others of the plurality of triggers, the scheduling/firing component 205 can fire the second trigger along with the one or more others of the plurality of triggers when appropriate. At that time the notification component 207 can notify the appropriate registered applications.

Accordingly, the embodiments herein can reduce the number of trigger firings/activations based on external events, and therefore the number of times the operating system must activate applications and execute their party code. This allows energy savings, use of other performance-impacting resources (such as CPU, memory and I/O bandwidth), and reduces heat output of the computing device.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors, for coalescing triggers resulting from stimuli that originate external to the computer system, the method comprising:

receiving a plurality of triggers, each trigger being associated with the occurrence of a corresponding external event that that results from an external stimulus received by the computer system, and having a type based on a type of the external stimulus;

identifying, based on a first type of a first trigger of the plurality of triggers, that the first trigger is time critical, and scheduling the first trigger for firing based at least on the first trigger being time critical;

identifying, based on a second type of a second trigger of the plurality of triggers, that the second trigger is opportunistic, and can therefore be delayed to a later available opportunity, the second trigger including a payload received from its corresponding external stimulus, the payload to be processed by an application registered to receive notification of triggers of the second type upon firing of the second trigger;

coalescing firing of the second trigger with one or more third triggers of the plurality of triggers that are of a different type than the second type based at least on the second trigger being opportunistic, including:

identifying that one or more conditions for firing the one or more third triggers align with a condition for firing the second trigger; and scheduling the second trigger for firing along with the one or more third triggers when the condition for firing the second trigger is met, including at least one of:

combining the payload of the second trigger with a payload of at least one fourth trigger of the plurality of triggers that is of the second type;

replacing the at least one fourth trigger; or invalidating the at least one fourth trigger; and subsequent to scheduling the second trigger for firing along with the one or more third triggers, firing the second trigger along with the one or more third triggers, and providing the payload to the application registered to receive notification of triggers of the second type.

2. The method of claim 1, wherein combining the payload of the second trigger with a payload of the at least one fourth trigger comprises at least one of:

replacing the payload of the at least one fourth trigger with the payload of the second trigger;

aggregating one or more values of the payload of the at least one fourth trigger and the payload of the second trigger; or concatenating one or more portions of the payload of the at least one fourth trigger with one or more portions of the payload of the second trigger.

3. The method of claim 1, wherein coalescing firing of the second trigger with the one or more third triggers comprises determining a system state relevant to firing the second trigger, and wherein the system state relevant to firing the second trigger comprises whether firing of the second trigger would generate a user-visible change in a user interface at the computer system.

4. The method of claim 3, wherein the system state relevant to firing the second trigger includes at least one of: (i) whether the at least one application registered to receive triggers of the type of the second trigger is actively executing, (ii) whether a screen of the computer system is on or off, (iii) whether a user interface of the at least one application registered to receive triggers of the type of the second trigger is currently being displayed; (iv) when the user interface of the at least one application registered to receive triggers of the type of the second trigger is anticipated to be displayed based on past application usage; or (v) whether a notification based on the firing of the second trigger would currently be displayed, if the second trigger were to be fired.

5. The method of claim 1, further comprising determining the condition for firing the second trigger, including determining a time period over which to coalesce triggers of the second type.

6. The method of claim 1, wherein the firing of the second trigger along with the one or more third triggers is based upon occurrence of the condition for firing the second trigger.

7. The method of claim 1, wherein the firing of the second trigger along with the one or more third triggers is based upon firing of the first trigger prior to occurrence of the condition for firing the second trigger.

8. The method of claim 1, wherein the condition for firing the second trigger comprises a time-based condition.

9. The method of claim 1, wherein the condition for firing the second trigger comprises a change in the system state relevant to firing the second trigger.

10. The method of claim 1, further comprising:
prior to firing the second trigger along with the one or more third triggers, identifying a new condition for firing the second trigger; and
re-scheduling the second trigger for firing along with the one or more third triggers when the new condition is met,
wherein firing the second trigger along with the one or more third triggers is based upon occurrence of the new condition.

11. The method of claim 1, further comprising determining the condition for firing the second trigger, including at least one of identifying data being processed by the at least one application, identifying application functionality, or identifying whether other applications rely on the at least one application.

12. A computer system, comprising:
one or more processors; and
one or more computer-readable media having stored thereon computer-executable instructions that are executable by the one or more processors to cause the computer system to coalesce triggers resulting from stimuli that originate external to the computer system, the computer-executable instructions including instructions that are executable to cause the computer system to perform at least the following:
receive a plurality of triggers, each trigger being associated with the occurrence of a corresponding external event that that results from an external stimulus received by the computer system, and having a type based on a type of the external stimulus;
identify, based on a first type of a first trigger of the plurality of triggers, that the first trigger is time critical, and schedule the first trigger for firing based at least on the first trigger being time critical;
identify, based on a second type of a second trigger of the plurality of triggers, that the second trigger is opportunistic, and can therefore be delayed to a later available opportunity, the second trigger including a payload received from its corresponding external stimulus, the payload to be processed by an application registered to receive notification of triggers of the second type upon firing of the second trigger;
coalesce firing of the second trigger with one or more third triggers of the plurality of triggers that are of a different type than the second type based at least on the second trigger being opportunistic, including:
identifying that one or more conditions for firing the one or more third triggers align with a condition for firing the second trigger; and
scheduling the second trigger for firing along with the one or more third triggers when the condition for firing the second trigger is met, including at least one of:
combining the payload of the second trigger with a payload of at least one fourth trigger of the plurality of triggers that is of the second type;
replacing the at least one fourth trigger; or
invalidating the at least one fourth trigger; and
subsequent to scheduling the second trigger for firing along with the one or more third triggers, fire the second trigger along with the one or more third triggers, and providing the payload to the application registered to receive notification of triggers of the second type.

13. The computer system of claim 12, wherein coalescing firing of the second trigger with the one or more third triggers comprises determining a system state relevant to firing the second trigger, and wherein the system state relevant to firing the second trigger comprises whether firing of the second trigger would generate a user-visible change in a user interface at the computer system.

14. The computer system of claim 12, wherein the condition for firing the second trigger comprises a time-based condition or a change in the system state relevant to firing the second trigger.

15. The computer system of claim 12, further comprising determining the condition for firing the second trigger, including at least one of identifying data being processed by the at least one application, identifying application functionality, or identifying whether other applications rely on the at least one application.

16. A computer program product comprising one or more hardware storage devices having stored thereon computer-executable instructions that are executable by one or more processors of a computer system to cause the computer system to coalesce triggers resulting from stimuli that originate external to the computer system, the computer-executable instructions including instructions that are executable to cause the computer system to perform at least the following:
receive a plurality of triggers, each trigger being associated with the occurrence of a corresponding external event that that results from an external stimulus received by the computer system, and having a type based on a type of the external stimulus;
identify, based on a first type of a first trigger of the plurality of triggers, that the first trigger is time critical, and schedule the first trigger for firing based at least on the first trigger being time critical;
identify, based on a second type of a second trigger of the plurality of triggers, that the second trigger is opportunistic, and can therefore be delayed to a later available opportunity, the second trigger including a payload received from its corresponding external stimulus, the payload to be processed by an application registered to receive notification of triggers of the second type upon firing of the second trigger;
coalesce firing of the second trigger with one or more third triggers of the plurality of triggers that are of a different type than the second type based at least on the second trigger being opportunistic, including:
  identifying that one or more conditions for firing the one or more third triggers align with a condition for firing the second trigger; and
  scheduling the second trigger for firing along with the one or more third triggers when the condition for firing the second trigger is met, including at least one of:
    combining the payload of the second trigger with a payload of at least one fourth trigger of the plurality of triggers that is of the second type;
    replacing the at least one fourth trigger; or
    invalidating the at least one fourth trigger; and
  subsequent to scheduling the second trigger for firing along with the one or more third triggers, fire the second trigger along with the one or more third triggers, and providing the payload to the application registered to receive notification of triggers of the second type.

17. The computer system of claim 12, further comprising determining the condition for firing the second trigger, including determining a time period over which to coalesce triggers of the second type.

18. The computer system of claim 12, wherein the firing of the second trigger along with the one or more third triggers is based upon occurrence of the condition for firing the second trigger.

* * * * *